United States Patent
Saunders et al.

(10) Patent No.: US 10,220,398 B2
(45) Date of Patent: Mar. 5, 2019

(54) ATOMIZING NOZZLE DEVICE, ATOMIZING PROCESS AND USE

(75) Inventors: George Saunders, Brandon, VT (US); Ryan Kittredge, Milford, OH (US)

(73) Assignee: Omya International AG, Oftringen (CH)

( * ) Notice: Subject to any disclaimer, the term of this patent is extended or adjusted under 35 U.S.C. 154(b) by 124 days.

(21) Appl. No.: 14/127,342

(22) PCT Filed: Jul. 9, 2012

(86) PCT No.: PCT/EP2012/063358
§ 371 (c)(1),
(2), (4) Date: Mar. 5, 2014

(87) PCT Pub. No.: WO2013/007673
PCT Pub. Date: Jan. 17, 2013

(65) Prior Publication Data
US 2015/0013769 A1    Jan. 15, 2015

Related U.S. Application Data

(60) Provisional application No. 61/506,306, filed on Jul. 11, 2011.

(30) Foreign Application Priority Data

Aug. 2, 2011   (EP) .................................... 11176306

(51) Int. Cl.
| | | |
|---|---|---|
| *B05B 7/04* | (2006.01) | |
| *B05B 1/34* | (2006.01) | |
| *B05B 7/06* | (2006.01) | |
| *B05B 7/26* | (2006.01) | |
| *F23D 1/00* | (2006.01) | |

(Continued)

(52) U.S. Cl.
CPC ......... *B05B 7/0416* (2013.01); *A01M 7/0003* (2013.01); *B01F 3/04063* (2013.01);
(Continued)

(58) Field of Classification Search
CPC ... B05B 7/0031; B05B 7/0037; B05B 7/0043; B05B 7/0441; B05B 7/0416;
(Continued)

(56) References Cited

U.S. PATENT DOCUMENTS 1,748,604 A * 2/1930 Heimburger ............ B60S 3/044
                                                              239/434.5
5,004,504 A   4/1991 Schroeder et al.
(Continued)

FOREIGN PATENT DOCUMENTS

CN   101116849 B   5/2010
DE   10126100 A1   12/2002
(Continued)

OTHER PUBLICATIONS

The International Search Report dated Aug. 2, 2012 for PCT Application No. PCT/EP2012/063358.
(Continued)

*Primary Examiner* — Alexander Valvis
*Assistant Examiner* — Cody Lieuwen
(74) *Attorney, Agent, or Firm* — Amster, Rothstein & Ebenstein LLP

(57) ABSTRACT

The invention relates to a new atomizing device with improved droplet formation. Smaller droplets are formed with increased micronized volume throughput, wherein high volumes of air are fed to a liquid sprayed from a liquid nozzle (2). High volume ratios result in mean free path between droplets being conveyed so as to minimize collisions and to prevent aggregation of the droplet.

20 Claims, 10 Drawing Sheets

(51) Int. Cl.
*A01M 7/00* (2006.01)
*B01F 3/04* (2006.01)
*A62C 99/00* (2010.01)

(52) U.S. Cl.
CPC .............. *B05B 1/34* (2013.01); *B05B 7/0475* (2013.01); *B05B 7/0491* (2013.01); *B05B 7/066* (2013.01); *B05B 7/267* (2013.01); *F23D 1/005* (2013.01); *A62C 99/0072* (2013.01); *B01F 2215/0036* (2013.01); *B01F 2215/0055* (2013.01); *B05B 7/0441* (2013.01); *B05B 7/0458* (2013.01); *Y10T 137/0318* (2015.04)

(58) Field of Classification Search
CPC ..... B05B 7/0458; B05B 7/045; B05B 7/0475; B05B 7/0491; B05B 7/066; B05B 7/267; B05B 1/34; B05B 1/06; B05B 1/26; B05B 7/0075; B05B 1/326; B01F 3/04063; B01F 2215/0036; B01F 2215/0055; A01M 7/0003; F23D 1/005; Y10T 137/0318; A62C 31/02–31/12; A62C 99/0072
USPC .......... 239/427, 427.3, 427.5, 432, 433, 434, 239/434.5, 398, 423
See application file for complete search history.

(56) References Cited

U.S. PATENT DOCUMENTS

| | | | |
|---|---|---|---|
| 5,439,690 A | 8/1995 | Knight | |
| 6,502,767 B2 * | 1/2003 | Kay | B05B 7/1486 239/433 |
| 2004/0166247 A1 | 8/2004 | Heinrich et al. | |
| 2004/0177247 A1 | 8/2004 | Hienrich et al. | |
| 2005/0040260 A1 * | 2/2005 | Zhao | C23C 24/04 239/548 |
| 2006/0201418 A1 * | 9/2006 | Ko | B05B 7/1486 118/308 |
| 2007/0194146 A1 * | 8/2007 | Dorendorf | F23D 11/103 239/419.3 |
| 2010/0016347 A1 | 1/2010 | Nandy et al. | |

FOREIGN PATENT DOCUMENTS

| | | | |
|---|---|---|---|
| EP | 1700638 A1 | 9/2006 | |
| GB | 166341 A * | 7/1921 | ............... B05B 1/26 |
| GB | 661054 | 11/1951 | |
| JP | 5845299 A | 3/1983 | |
| JP | 61204667 U | 12/1986 | |
| JP | 62114673 A | 5/1987 | |
| JP | 2108756 U | 8/1990 | |
| JP | 2000237338 A | 9/2000 | |
| JP | 2002224549 A | 8/2002 | |
| JP | 2003260342 A | 9/2003 | |
| JP | 2010184169 A | 8/2010 | |
| WO | 02087776 A1 | 11/2002 | |

OTHER PUBLICATIONS

The Written Opinion of the International Searching Authority dated Aug. 2, 2012 for PCT Application PCT/EP2012/063358.

* cited by examiner

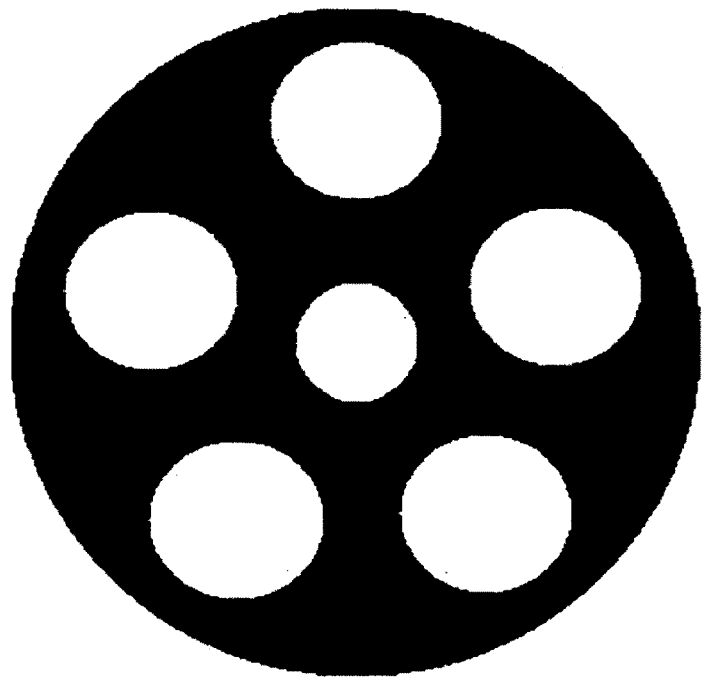
FIG.9    Diffusor Plate DP
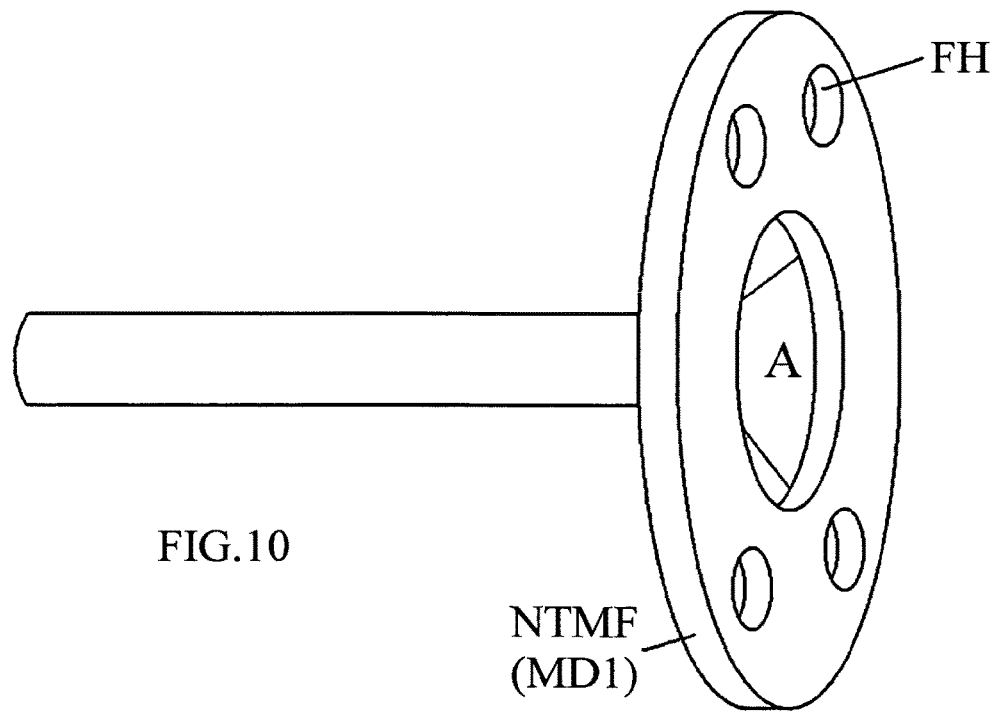
FIG.10

Front Perspective (solid)  Front  Side  Back  Back Perspective (transparent)

conversion table inches to mm ( 1 inch = 25.4 mm)
| inch | 6.00 | 13.50 | 3.25 | 4.00 | 3.50 | 7.13 |
|---|---|---|---|---|---|---|
| mm | 152.4 | 342.9 | 82.55 | 101.6 | 88.9 | 181.1 |

ATOMIZING NOZZLE DEVICE, ATOMIZING PROCESS AND USE

CROSS-REFERENCE TO RELATED APPLICATIONS

This application is a U.S. national phase of PCT Application No. PCT/EP2012/063358, filed Jul. 9, 2012, which claims priority to U.S. Provisional Application No. 61/506,306, filed Jul. 11, 2011 and European Application No. 11176306.6, filed Aug. 2, 2011.

FIELD OF THE INVENTION

The present invention relates to a fluid atomizer comprising a liquid nozzle, said liquid nozzle being surrounded in circular manner by a converging air header with an air transition cone and an atomizer nozzle tip connected down-stream to the converging air header, optionally comprising a mixing chamber, the nozzle orifice connected to the optional mixing chamber, positioned down-stream of said mixing chamber.

Liquids as well as solid particle containing dispersions such as mineral matter slurries are sprayed or atomized into fine droplets in order to increase the specific droplet surface, which may lead to improved chemical or engineering processes. Thus reactions or reaction parameters can considerably depend on the droplet size.

The present invention therefore provides for an improved atomizing device and atomizing of liquids or solid particles containing slurries, dispersions or emulsions into micronized droplets. Within the context of the present invention, an atomizer is a device which converts a stream of liquids as herein described before into a fine spray. Further, the present invention also relates to the use of such an atomizing device and micronized droplets. Such use can be, for example, in the field of agriculture where crop related products need to be finely dispersed over seeds and/or plants, in painting and/or coating, in combustion processes for improved removal of contaminants produced during said combustion process, in spray drying of solid particles containing slurries or dispersions, or in fire-fighting. The present invention further relates also to slurries, dispersion or emulsions to be sprayed with the atomizing device of the present invention.

BACKGROUND OF THE INVENTION AND RELATED ART

In the field of agriculture, crop and plant protection as well fertilisation are some times necessary to provide for a lucrative harvest. Crop protectants and fertilizers need to be deployed with high efficiency in order to be cost-effective. This can be achieved by the present invention, because the atomizing device provides for a highly efficient dispersion or atomization of the fluid. Within the context of the present invention, fluid encompasses any liquid material, dispersions, suspensions and emulsions.

In the field of fire-fighting, one method to extinguish a fire is to use water. The first way water extinguishes a fire is by cooling, which removes heat from the fire. This is possible through the water's ability to absorb massive amounts of heat by converting water to water vapor. The second way water extinguishes a fire is by smothering the fire. When water is heated to its boiling point, it converts to water vapor. When this conversion takes place, it dilutes the oxygen in the air with water vapor, thus removing one of the elements that a fire requires to burn. This can also be achieved with foam. It is therefore of paramount importance to have the fire extinguishing media being dispersed in as small as possible droplets to provide a high surface area for the cooling and smothering effect.

In the field of combustion processes, known from e.g. coal-fired power plants, which use power boilers for producing electricity world wide; coal, previously referred to as pitcoal or seacoal, a fossil fuel extracted from the ground by underground or surface mining is burnt in particular furnaces. Depending on the type of coal (anthracite, bituminous, subbituminous or lignite) and whose abundance varies within geographical regions, the sulphur content in such coals varies significantly and increasingly in the order mentioned before. Thus lignite is a type of coal with sulphur content up to 10% by weight of the coal and sometimes even more. The problematic of the sulphur content becomes evident, as during the combustion process of coal, besides the formation of carbon dioxide ($CO_2$), the sulphur is transformed into sulphur dioxide ($SO_2$), which accounts for the largest human-caused source of $SO_2$, a pollutant gas that contributes to the production of acid rain and causes significant health problems. Other contaminants, such as nitrogen oxides ($NO_x$), hydrochloric acid and heavy metals such as mercury, arsenic, lead, selenium and cadmium are hazardous compounds which are further produced and/or accumulated during such combustion processes.

The combustion processes are, however, not restricted to power plants only. There exist other technologies which use high temperature processes in boilers, such as the paper industry, the steel industry, the waste incineration industry, or mineral material producers, just to mention some.

For many decades environmental concerns and thus the evolving environmental regulations have led to steady improvements in these high temperature process technologies. Particularly, the pollutants, toxic wastes, and fine particles have been targeted to be captured and thus eliminated from the exhausts of the combustion and/or heat processes to reduce their release into the atmosphere and to reduce corrosion within such systems. One way of reducing carbon dioxide to be released into the atmosphere was to increase the efficiency of coal burning or improved reaction processes. However, it is not possible to avoid the formation of such pollutants and therefore there is still a high demand in processes which allow the capture of such pollutants and to remove them from the exhausts to provide exhausts which are almost free of such contaminants. Such processes are known to the skilled person.

In order to comply with the environmental regulations and to meet the limitations affecting the release of pollutants into the atmosphere, the combustion products formed in the industrial combustion processes are passed through flue gas desulfurization (FGD) systems. The treatment of flue gas to capture $SO_2$ is often carried out in lime- or limestone-based wet scrubbers, in which the lime or lime-stone slurries are contacted with the flue gas before the flue gas is discharged into the atmosphere. The effectiveness of such scrubbers are quite satisfying in capturing the 1%-2% of the sulphur present in the fuel, however, they require important investments.

A different method uses the injection of a lime- or limestone slurry into the high temperature region of the boiler, a technology known as LIMB (Limestone Injection Multistage Burner). This technology however is not able to capture more than 60% to 65% of the formed $SO_2$.

A further method is the Furnace Sorbent Injection method (FSI) wherein lime and limestone are injected in the form of a slurry into the furnace with an effectiveness of sulphur capture of 10% to 60%. Another suitable sorbent is dolomite, which however does not exceed the effectiveness mentioned before.

In order to finely spray liquids or solid particles containing slurries or dispersions in the form of fine droplets, the application US 2010/0163647 which refers to a two-fluid nozzle allows to obtain a large spray jet opening angle with fine droplet atomization. Formation of large droplets at the edge of the nozzle is prevented by an annular clearance atomization at the edge of the nozzle by secondary air branched off directly from the annular chamber surrounding the mixing chamber. Pressure gas leaving the annular clearance with high velocity ensures that a liquid film on the wall of the nozzle orifice of the divergent section is drawn out to a very thin lamella, which then is broken down into small droplets. Part of the pressure gas is thus diverted into the mixing chamber and part of it to the edge of the nozzle orifice.

US 2007/0194146 provides for a nozzle capable of multiple atomizing steps of a liquid, wherein the liquid is atomized in a first direction and subsequent post atomization of the same liquid in a second direction is made to form a counter flow nozzle. Accordingly, the liquid to be dispensed is atomized in at least two separate stages.

U.S. Pat. No. 5,004,504 refers to the preparation of red transparent iron oxide by spray drying. A filter cake is disbursed in the form of small droplets by a two fluid nozzle, said nozzle comprising a cylindrical central conduit and an annular conduit surrounding the cylindrical conduit. The process fluid, which as an aqueous mass of yellow transparent iron oxide, is passed through the central conduit while an atomizing fluid supplied through the surrounding annular conduit is forced under pressure through the annular conduit. No or little pressure is needed to transport the aqueous mass of yellow transparent iron oxide through the central conduit. Atomizing of the obviously thick aqueous mass of transparent yellow iron oxide is achieved as a result of using a high pressure atomizing fluid such as compressed air or super heated steam at pressures of from about 5.5 bar to about 6.8 bar or even higher.

Thus the prior art related to an atomization process provides for different tailor made nozzle geometries to be used in different applications each seeking to have the best efficiency.

SUMMARY AND DESCRIPTION OF THE INVENTION

The present invention provides for a new single step atomizing device with improved droplet formation, i.e. smaller droplet formation with increased micronized volume throughput, and thus increased reaction or process efficiency, wherein said micronized droplets are applicable e.g. in a Furnace Sorbent Injection method, in spray drying, or other applications mentioned above.

Such Furnace Sorbent Injection methods comprise the methods of dry powder injection or water based slurry injection of sorbent material. The general principle of such coal burning power boiler is that powdered coal and air are brought into the furnace and burnt wherein either a secondary water circuit is heated up to transform the water into steam for powering the generator turbine, or the hot air of the combustion process is used downstream of the burning moiety to the heat up a secondary water circuit for steam production. The steam is then used to propel the generator turbine and thereafter cooled down for re-introduction into the water circuit which serves for steam production.

In both cases, the hot exhaust has to be treated with a sorbent to capture the toxic waste. This can be achieved by placing the atomizer of the present invention above the up-fired burner of the coal burning unit in such a way that the atomizer nozzle tip is not in direct contact with the combustion flame. The furnace is in general a vertical up-fired high cylinder. The ratio height to diameter is selected in such a way, that it allows for gas velocities of 10-15 feet per second and residence times of 1 to 4 seconds, depending on the up-firing rate. The design furnace exit gas temperature is in the range of 800° C.-1100° C. The described furnace is of mere illustrative character and is not to be construed as limiting to the present invention. The skilled person will readily recognize that other furnace with different firing chamber set up can be equipped with the atomizer of the present invention as well.

The injection of the sorbent material via the atomizer nozzle tip into the furnace can be carried out as co-flow injection or counter-flow injection. Within the context of the present invention, co-flow injection means, that the sorbent material is injected or sprayed in the same direction as the exhaust gas from the up-firing burning unit, whereas counter-flow injection means that the sorbent is injected or sprayed contrary to the flow direction of the exhaust gas from the up-firing burning unit.

It will be within the understanding of the skilled person, that the injection of the sorbent material is possible at any stage or position down stream of the burning process, depending on the construction of the power boiler unit and prior to the release of the exhaust gas into the atmosphere. Some power boilers provide the water circuits for steam production in or immediately after the up-firing burning unit, or further downstream of the furnace, where temperatures are still convenient for steam production. Particular power boilers also use the downstream exhaust gas temperature to exploit the residual heat for preheating the condensed water—after the generator turbine—in the water circuit for new steam production. This way exhaust gases are further cooled down prior to the release into the atmosphere.

DESCRIPTION OF THE DRAWINGS

FIG. 9 illustrates one possible embodiment of a diffuser plate.

FIG. 10 illustrates a perspective view of one embodiment of an atomizer nozzle tip according to FIG. 4a of the present invention.

DETAILED DESCRIPTION OF THE INVENTION

Figure 1:
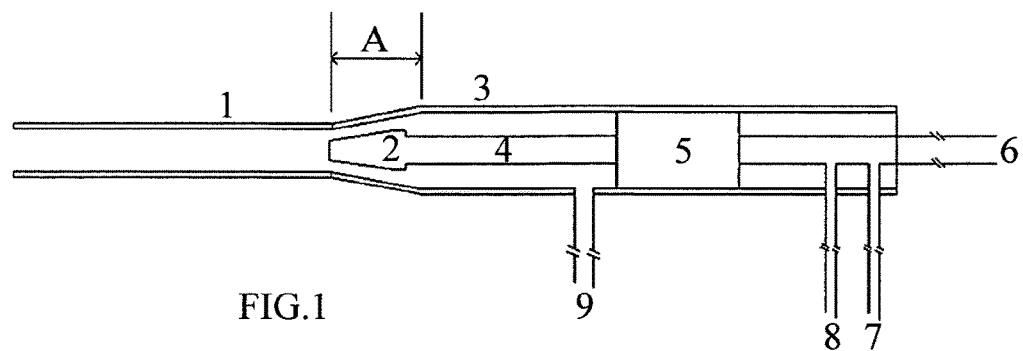
FIG. 1 illustrates a cross sectional view of one embodiment of the atomizer of the present invention.

Micronisation of the droplets of the mineral matter slurry can be achieved by an atomizing device such as shown in FIG. 1, which represents one embodiment of the present invention and wherein 1 is the atomizer nozzle tip, 2 is a commercially available liquid nozzle, 3 is a converging air header, with an air transition cone A, surrounding in circular manner the liquid nozzle 2 which is connected via a central lance tube 4 with an optional mixing chamber 5, said optional mixing chamber 5 is fed by an inlet 6. Said inlet 6 can be equipped with a fluid inlet 7 and/or an air inlet 8. An air inlet 9 for supplying a gas or a gas mixture such as nitrogen, air, vapour, or steam is connected to the converging air header 3. This design permits the introduction of a large volume of low pressured gas as a co-current ring around the nozzle. The position of the nozzle 2 is adjustable in such a way that the nozzle 2 can be moved in or out of the air transition cone A—in fact any mechanism that allows the nozzle to be adjusted within the air transition cone A to achieve optimal mixing conditions of the fluid droplets with the primary air to set or change the air velocity at the point of mixing, i.e. the point where the accelerated air comes into contact with the sprayed liquid escaping form the nozzle orifice up to sonic velocity is beneficial (FIG. 2).

Low pressure gas or low pressure air within the context of the present invention means that a gas or air, in general a fluid, which is supplied under a pressure comprised between 0.005 bars and below 5.0 bars, such as 4.0 bars or 3.0 bars or 2.5 bars or 2.0 bars or 1.5 bars.

Figure 2:
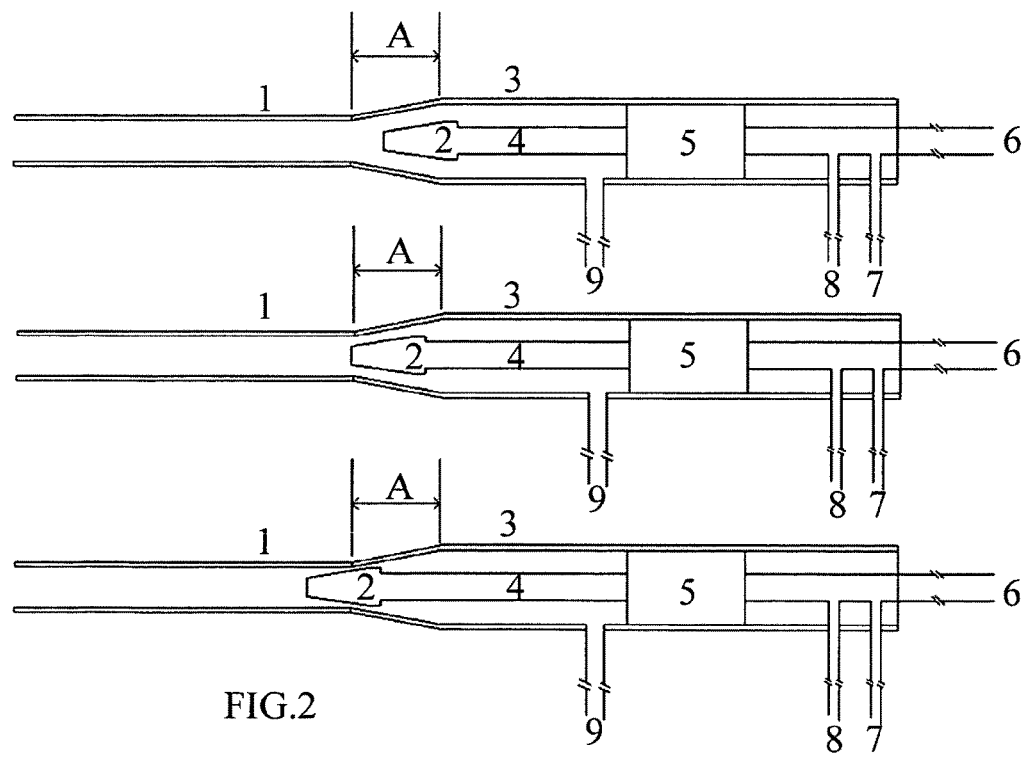
FIG. 2 illustrates a cross sectional view of one embodiment of the atomizer of the present invention, wherein the position of the liquid nozzle 2 can be adjusted relative to the converging air transition cone A.
Figure 3:
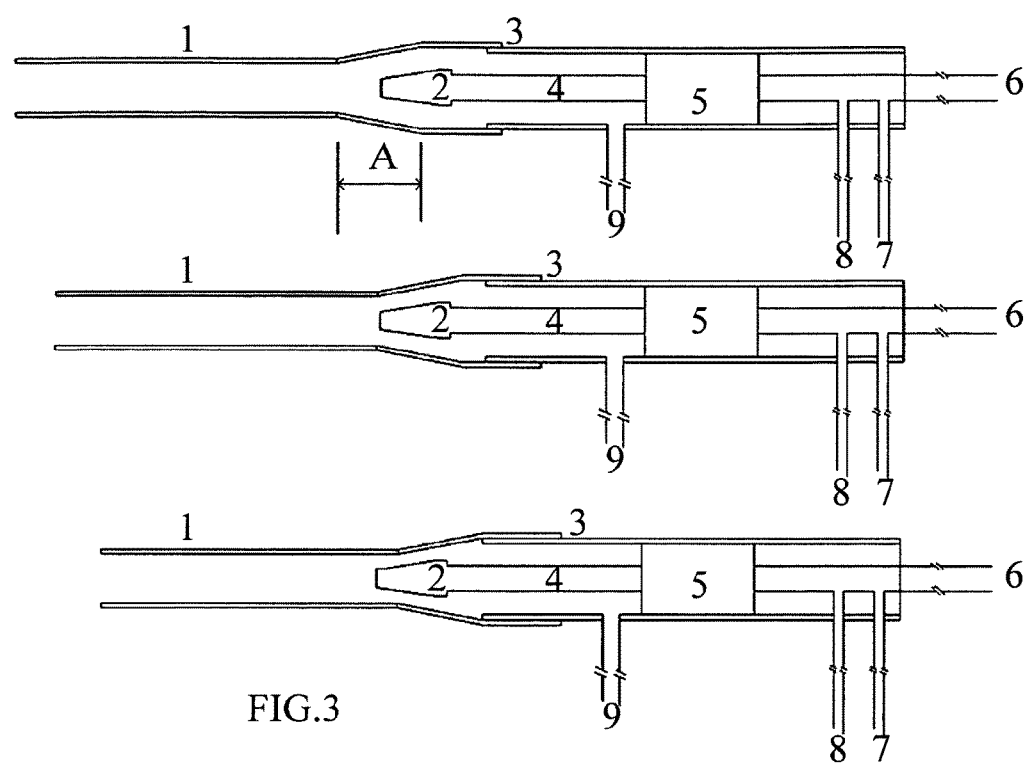
FIG. 3 illustrates a cross sectional view of one embodiment of the atomizer of the present invention, wherein the housing has parts sliding over each other to adjust the position of the converging air transition cone A relative to the liquid nozzle 2.

Adjusting of the proper nozzle position within the converging air header can be achieved by several means, such as moving the central lance carrying the nozzle forward or backward inside the converging air header as shown in FIG. 2, by providing an overlapping housing with movable parts, where one part comprises the converging air header, and the other part comprises the central lance carrying the nozzle, the two parts sliding relative to each other as shown in FIG. 3.

Figure 4:
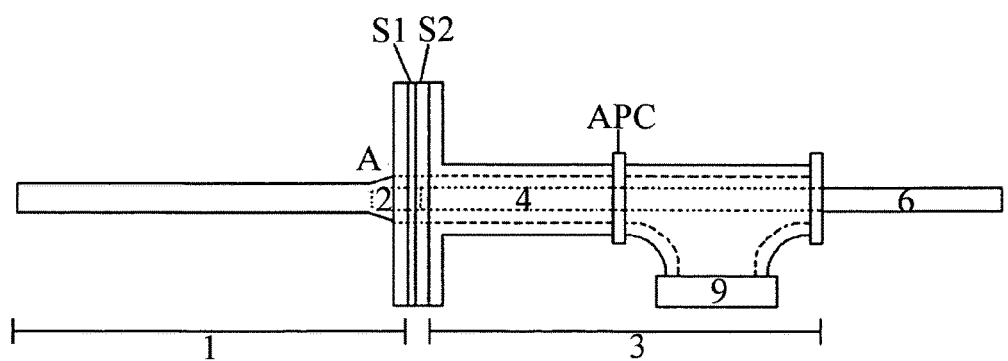
FIG. 4 illustrates a cross sectional view of one embodiment of the atomizer of the present invention.
Figure 8:
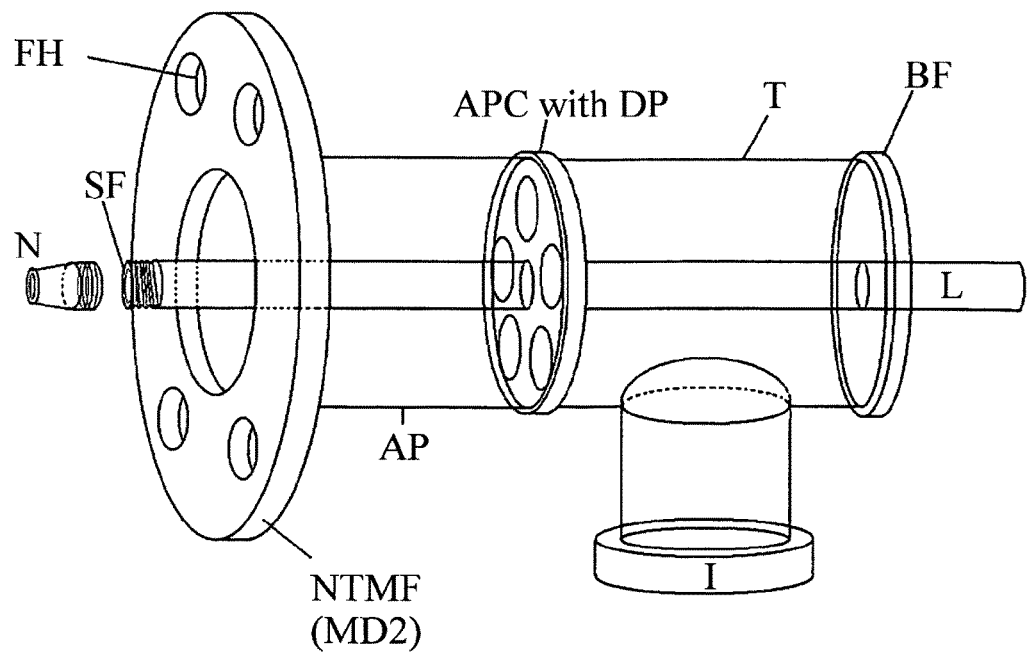
FIG. 8 illustrates a perspective view of one embodiment of the atomizer of the present invention according to FIG. 4, without the nozzle comprising the converging air transition cone A.
Figure 11:
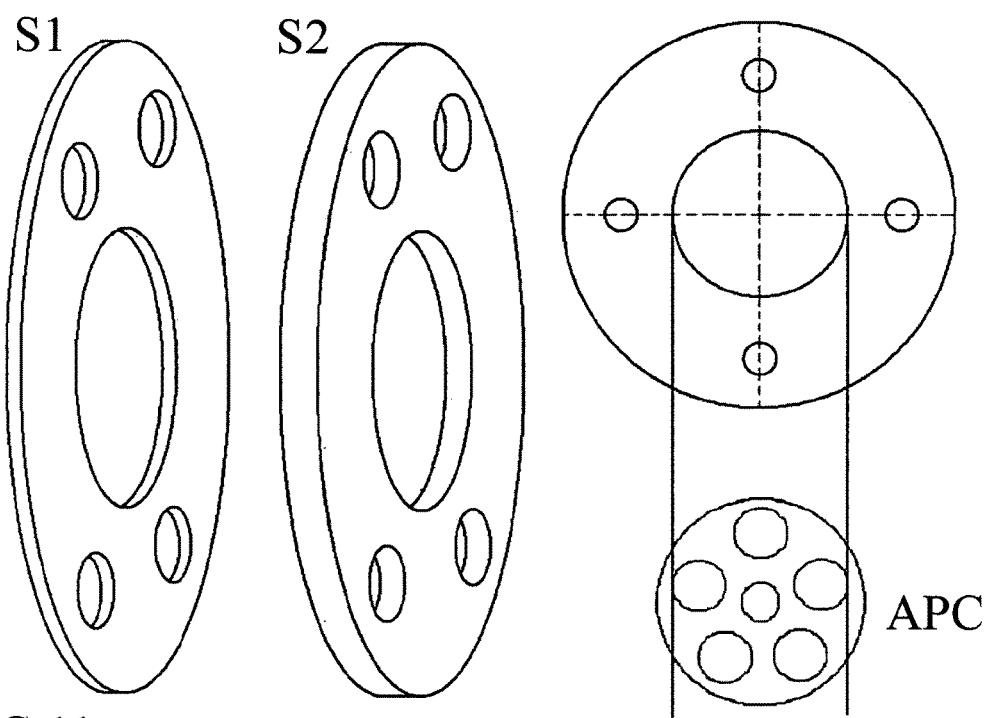
FIG. 11 illustrates a perspective view and end view of spacer plates such as S1, S2 according to FIG. 4 and the arrangement of the holes in the diffuser plate in an air plenum cap APC according to FIG. 8.
Figure 12:
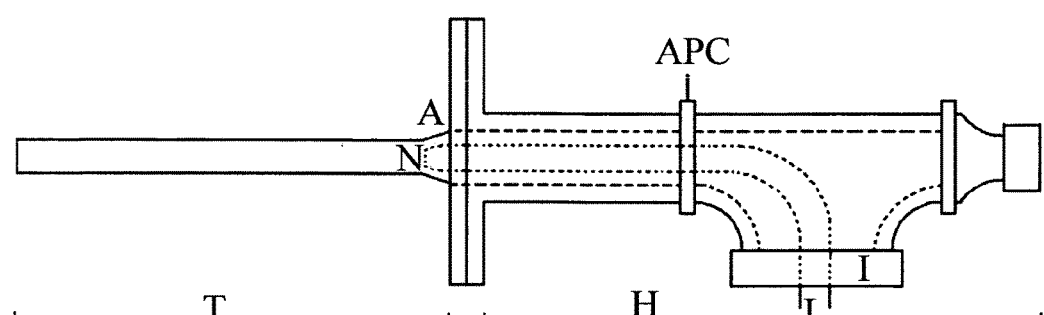
FIG. 12 illustrates a cross sectional view of an alternate configuration of the atomizer of the present invention.
Figure 13:
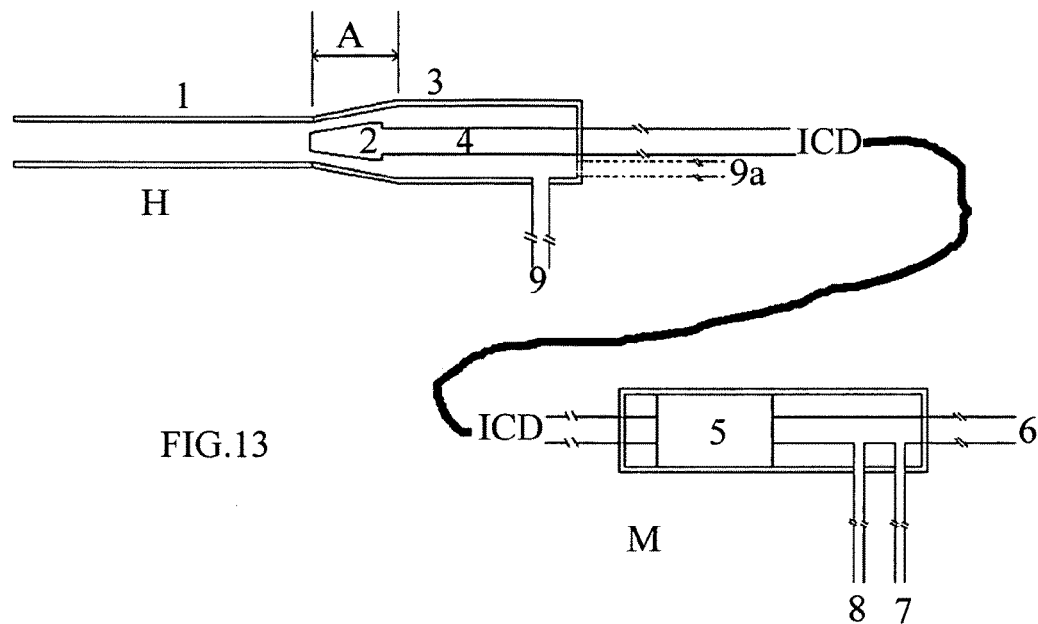
FIG. 13 illustrates a cross sectional view of an alternate configuration of the atomizer of the present invention, wherein the H and M are two separated entities connected via an interconnecting device ICD.
Figure 14:
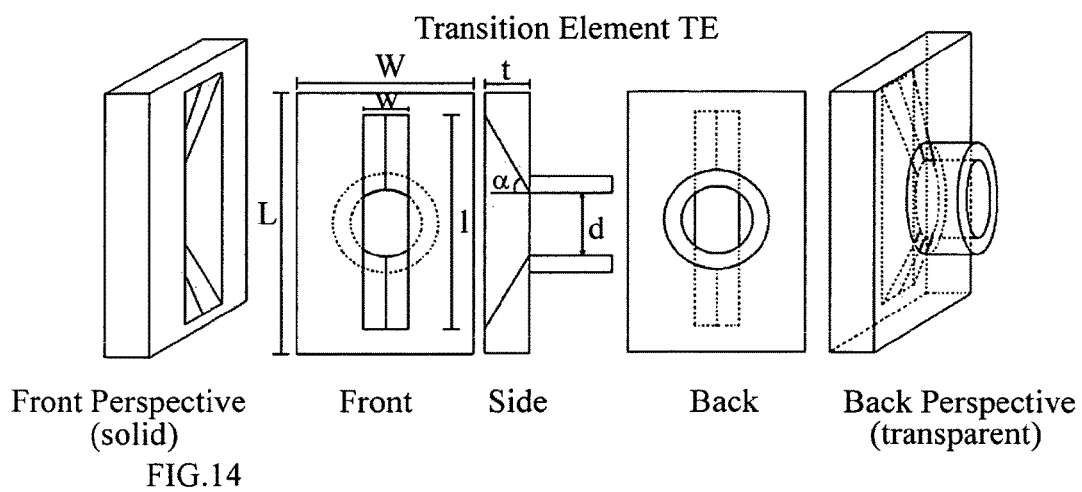
FIG. 14 illustrates cross sectional and perspective views of a nozzle transition element TE round to square.

In a further embodiment the adjusting of the position of the liquid nozzle 2 within the converging air header cone A is shown in the FIG. 4. Hereby one or more spacer plates S1, S2 (FIG. 11), can be placed between the nozzle tip 1 (FIG. 10) carrying the converging air header cone A and the housing 3 (FIG. 8), whereby the housing 3 carrying the lance 4 with the mounted nozzle 2 is reversibly or irreversibly connected with the nozzle tip 1 by any means known to the skilled person, e.g. by glue, screws, pipe clamps, ring-sleeves bolts or other fixing means. It is within the discretion of the skilled person that any means or arrangements which allow for the positioning of the nozzle 2 within the converging air header cone A are within the conception of the present invention. Inlet 9 provides for a supply of gas or a gas mixture such as air, vapour, steam, which allows for the introduction of a large volume of air, gas or steam which is directed as a co-current ring of air, gas or steam around the nozzle 2.

Figure 4A:
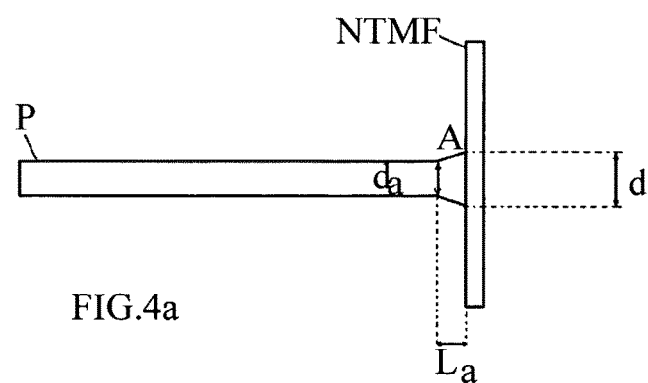
FIG. 4a illustrates a cross sectional view of the nozzle tip 1 of FIG. 4.

FIG. 4a refers to one embodiment of a nozzle tip, wherein the converging air transition cone A is comprised in the nozzle tip. P refers to the pipe length, which is a stainless steel pipe×60.96 cm (24 inches) long, NPT threaded on end of opposite flange, wherein NPT refers to the United States National Pipe Thread. There are some commonly used NPT Thread sizes such as 3.175 mm, 6.35 mm, 9.525 mm, 12.70 mm, 19.05 mm, 25.40 mm, 31.75 mm, 38.10 mm, 50.80 mm—corresponding to ⅛, ¼, ⅜, ½, ¾, 1, 1¼, 1½ and 2 inches. $L_a$ refers to the length of the converging air transition cone A made of a 3.175 mm (⅛ inch) thick stainless steel alloy 304 also known as "18/8" steel which indicates the minimal content of Chromium (Cr) and Nickel (Ni) to be present. The $d_a$ refers to the inner diameter of the pipe which is equivalent to the diameter Q1 in FIG. 5, and d refers to the inner diameter of large end of the converging air transition cone A which is equivalent to Q2 in FIG. 5. The cone angle is determined by the side walls of the converging air transition cone A. The tip geometries in the present inventions can be selected from but are not limited to the values as found in table 1.

TABLE 1

| Values for nozzle tips, comprising the converging air transition cone A. | | | | | | | | | | | | |
|---|---|---|---|---|---|---|---|---|---|---|---|---|
| P (cm) | 60.96 | 60.96 | 60.96 | 60.96 | 60.96 | 60.96 | 60.96 | 60.96 | 60.96 | 60.96 | 60.96 | 60.96 |
| NPT Thread (mm) | 38.10 | 38.10 | 38.10 | 31.75 | 31.75 | 31.75 | 25.40 | 25.40 | 25.40 | 19.05 | 19.05 | 19.05 |
| Cone angle (deg.) | 37 | 30 | 10 | 45 | 30 | 10 | 45 | 30 | 10 | 45 | 30 | 10 |

TABLE 1-continued

Values for nozzle tips, comprising the converging air transition cone A.

| | | | | | | | | | | | | |
|---|---|---|---|---|---|---|---|---|---|---|---|---|
| $L_a$ (mm) | 23.3680 | 23.8760 | 27.9400 | 22.8092 | 24.1300 | 29.2100 | 21.8440 | 22.4790 | 31.7500 | 21.0820 | 22.7076 | 35.5600 |
| $d_a$ (mm) | 40.8940 | 40.8940 | 40.8940 | 35.0520 | 35.0520 | 35.0520 | 26.6700 | 26.6700 | 26.6700 | 20.8280 | 20.8280 | 20.8280 |
| d (mm) | 76.2000 | 68.5800 | 50.8000 | 80.7720 | 62.9920 | 45.4660 | 70.3580 | 52.5780 | 37.8460 | 62.9920 | 47.2440 | 33.5280 |
| Sched.* | 40 | 40 | 40 | 40 | 40 | 40 | 40 | 40 | 40 | 40 | 40 | 40 |

*The term schedule 40 refers to the wall thickness of a standard nominal pipe size in North America. i.e., the outer diameter remains constant. The inner diameter decreases with higher schedule numbers. Schedule number relates directly to the pressure rating of the pipe.

The nozzle tip mounting flange (NTMF), has a dimension of 12.7 mm×190.50 mm (½ inch×7.5 inches) comprising 4 bolt standard 152.4 mm (6 inches) pattern drilled for alignment shoulder bolts.

As can be seen from the FIG. 1-3 or 4, the converging air header cone A can be an integral part of the housing or the nozzle tip. When the converging air header cone A is part of the nozzle tip, it will be easily seen that such a device set up provides for a very easy and flexible adaption of the atomizing conditions and thus adaption to various applications and use conditions.

The liquid nozzle is a commercially available nozzle capable of creating a full or a hollow cone spray at cone angles form 20-80 degrees. Such nozzles, such as ¼M-8, ¼M-4, Spiral Jet 7® or Flomax 0X15®, just to mention some, are known from suppliers such as Spraying Systems Co®.

The liquid nozzle is used to inject a spray of droplets into a high shear zone at the entrance of the nozzle tip 1. Said shear zone is the zone wherein the liquid spray from the nozzle comes into contact with the air from the converging air header A. The position of the shear zone is thus dependent from the relative position of the nozzle inside the converging air header cone A.

Droplets from the liquid nozzle 2 entering the high shear zone are introduced to the secondary air in the nozzle tip supplied by the converging low pressure air header 3 fed with high volume low pressure air through an air inlet 8. The volume ratio of the secondary air of the converging air header to liquid sprayed from the liquid nozzle 2 is kept at a ratio of from 100:1 to about 4000:1. Higher ratios such as 5000:1; 6000:1; 7000:1, or 8000:1 and still higher ratios lie within the concept of the present invention. High volume ratios result in mean free path between droplets being conveyed so as to minimize collisions and to prevent aggregation of the droplets. It is within the understanding of the skilled person, that a suitable ratio is also from about 200:1 or 300:1 or 400:1 or 500:1 or 600:1 or 700:1 or 800:1 or 900:1 or 1000:1 to about the ratios already mentioned above, including 2000:1 or 3000:1 or 4000:1. The skilled person will also recognize that these values are not of limiting character, as any ratio comprised form 100:1 to 8000:1 and even higher ratios can be chosen according to the particular needs.

Figure 5:
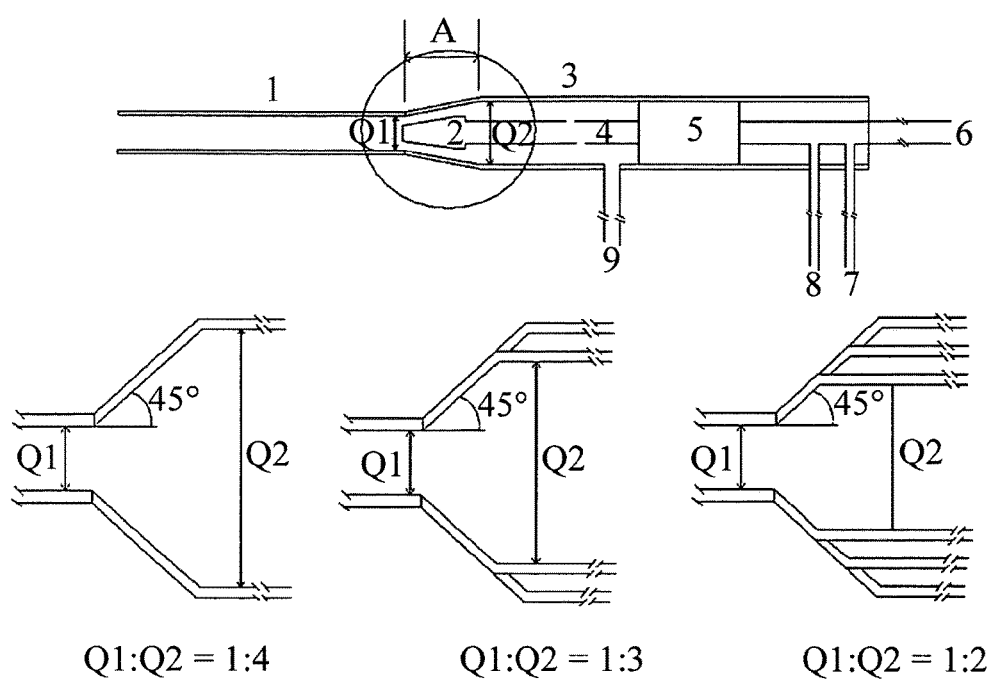
FIG. 5 illustrates a cross sectional view of one embodiment of the atomizer of the present invention, with detailed view of the converging air transition cone A, having different diameter ratios.
Figure 6:
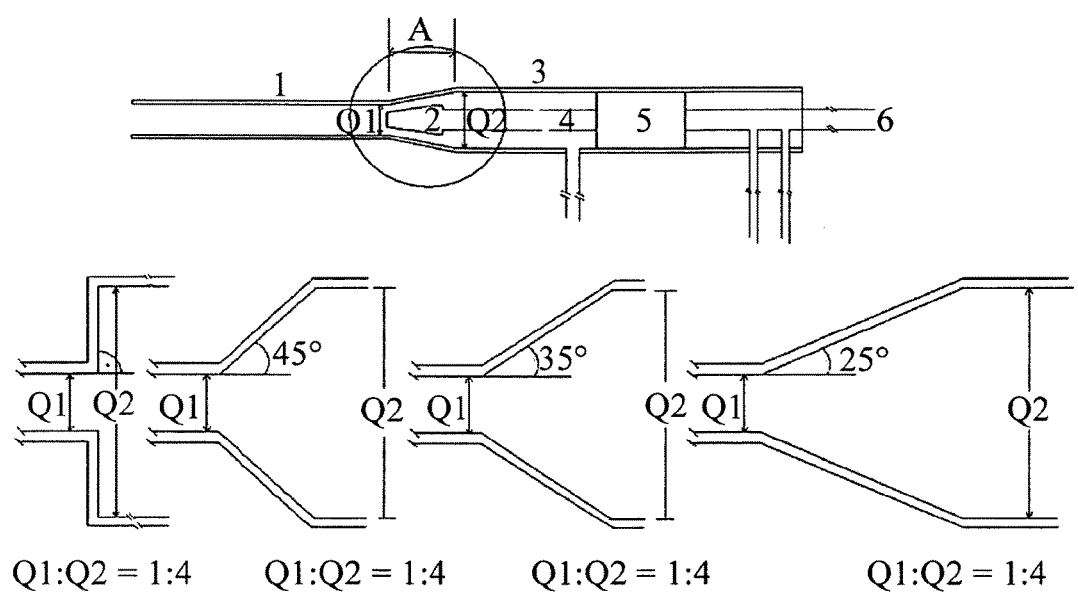
FIG. 6 illustrates a cross sectional view of one embodiment of the atomizer of the present invention, with detailed view of the converging air transition cone A, having different cone angels.
Figure 7:
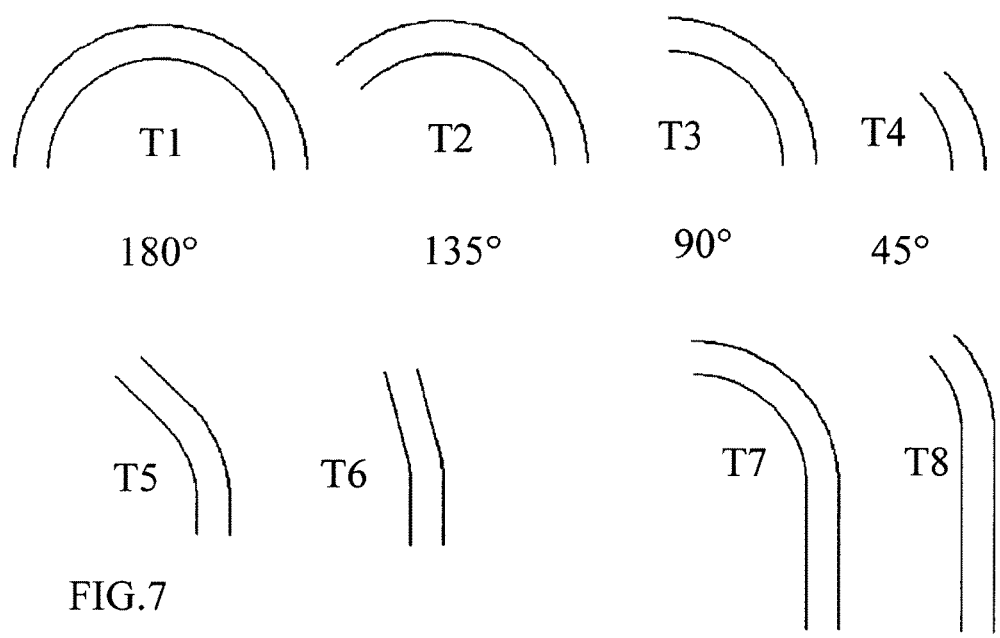
FIG. 7 illustrates a cross sectional view of different embodiments of the atomizer nozzle tip.

The approach angle, which is the angle of attack of the air stream towards the stream of the atomized fluid of the nozzle can be varied from and including 0 degree to and including 90 degrees by varying the angles of the converging air transition cone A, see FIG. 5. The exemplified approach angle shown in FIG. 5. is 45 degree. When the angle of the converging air transition cone is 180 degrees, which within the context of the present invention means, in a right angle to the air pressure header, 0 degrees, means within the context of the present invention, in line, or parallel with the housing of the air pressure header.

The ratio of the diameter of the nozzle tip to the diameter of the air pressure header lies in the range of 1:1 to 1:10, where in between the air transition cone A is present. Said air transition cone A having the small diameter Q1 equal to the diameter of the nozzle tip and the large diameter Q2 equal to the diameter of the air pressure header. The converging air transition cone A thus can have an opening angle of from 180 degrees, to 0 degrees. In a further embodiment, the diameter ratio of nozzle tip to air pressure header is kept constant within the range of Q1:Q2=1:1-1:7, e.g. 1:4 and the angle of the air transition cone is kept constant, e.g. at an angle of 45 degree (see FIG. 6), or the angle can be varied as described hereto before. It lies within the understanding of the skilled person that the ratio of Q1:Q2 can be achieved either way, i.e. by varying the diameter of Q1 and/or Q2. Thus a ratio of Q1:Q2=1:1 is achieved with the equal diameters of Q1 and Q2, but with diameters of different size, such as explained in the following non-limiting examples. Q1=Q2=4 cm, or 5 cm or 10 cm. the diameters having different values, but having the same ratio, 1:1.

The nozzle tip having a length to diameter ratio of from about 50:1 to about 0.5:1., preferably from about 20:1 to about 1:1, more preferably form about 15:1 to about 5:1. The nozzle tip may also be bent on an angular offset, the angular offset sometimes also referred to as angular bend being comprised between and including 180 degrees to about and including 90 degrees. The bend can be present either at the end of the nozzle tip or be comprised somewhere in between the edges of the nozzle tip. The skilled person will be able to think of various forms of such nozzle tips, some examples are shown in FIG. 7. however the presented embodiments are not of limitative character, but rather illustrative examples.

One preferred embodiment has a nozzle tip length to diameter ratio of 10:1, a nozzle tip diameter to air pressure header diameter ratio of 1:5, wherein the air transition cone has an opening angle of 75 degrees.

Diffuser plates (DP) and vanes may serve as air regulators and may be incorporated in the air header housing 3 to minimize turbulences and to ensure a uniform distribution of air flow around the liquid spray emanating form the liquid nozzle 2. Such diffuser plates can be integrated in a so called air plenum cap (APC), which can be made into a removable part or a fixed element of the housing. FIG. 8. shows least one diffuser plate (DP) is present between the converging air header cone and the air inlet (9, I). In a particular embodiment the diffuser plate can be also present between the mounting devices MD1 and MD2, and can thus serve as both, a diffuser plate and spacer. The presence of a diffuser plate DP however is not mandatory and thus optional. Further FIG. 8 shows that the T-shaped housing T is connected to the air plenum AP via the air plenum cap APC comprising a diffuser plate DP. The geometry and values of the housing of FIG. 8 will now be further described from but are not limited to those values. T is a 76.20 mm (3 inch) Tee ASTM A403 welded fitting, schedule 40. BF refers to a but flange with a dimension of 101.6 mm (4 inch) diameter×6.35 mm (¼ inch) thickness. L refers to a 9.252 mm (⅜ inch) slurry pipe made of a 304 stainless steel with a length of 381.00 mm (15 inch) and NPT threaded on end, to allow for the mounting of a liquid Nozzle N and a slurry supply device. I refers to 76.20 mm (3 inch) half coupling, 150 lb. screwed fitting. NTMF refers to a nozzle tip mounting flange with a thickness of 12.7 mm× diameter of 190.50 mm (½ inch×7.5 inch), comprising 4 fixing holes FH, arranged in a 152.4 mm (6 inch) diameter circle for alignment bolts to fix a type of nozzle tip as shown in FIG. 10. Thus the NTMF of FIG. 10 is synonymous to MD1. The counterpart of the NTMF of FIG. 10. being the NTMF of FIG. 8, synonymous to MD2.

SF refers to a 9.252 mm (⅜ inch) 150 lb. screwed fitting, whereas AP is an air plenum 76.20 mm (3 inch), schedule 40, made of a 304 stainless steel with a length of 152.4 mm (6 inch). The air plenum cap APC with diffuser plate DP, made of 304 stainless steel, with a diameter of 101.6 mm (4 inch) and thickness of 6.35 mm (¼ inch), comprises 5 holes with 2.54 mm diameter and a central hole for L. The single parts described hereto before are reversibly or irreversibly interconnected with each other, such connecting means being known to the skilled person. As a non limiting example, welding or gluing represent such connecting means.

Atomization of the liquid, i.e. droplet size reduction takes place in the shear zone, the zone where the air from inlet 9 impinges on the liquid spray emanating from the nozzle 2 due to the high shear forces in the shear zone as the liquid spray and air are accelerated to near sonic velocity. Diffuser plates which allow to provide a homogenous air stream may be of different geometry. FIG. 9 provides for an exemplified diffuser plate, which shall be considered as a non-limiting design.

The fluid mixing chamber 5, which can be present or not, is used to produce a homogenous blend of solid matter particle slurry, high pressure air and optionally further diluents. The mixing chamber comprising a mixing device selected form a static or a high shear powered mixing device, in fact any suitable mixing device to provide for a suitable material for atomization. High pressurized air may be introduced in to the solid matter slurry prior to the fluid mixing chamber 5 via a high pressure inlet 7 into the solid matter slurry inlet 5 or as an alternative embodiment; the high pressure air can be introduced via a high pressure inlet in the mixing chamber itself. To further adjust the solid matter slurry prior spraying via the liquid nozzle 2, a diluents inlet 8 can be present in the slurry inlet 6 or the mixing chamber 5. When the mixing chamber is not present, the slurry inlet 6 is feeding the liquid nozzle via the central lance tube 4.

Within the context of the present invention, high pressurized air means that a gas or air, in general a fluid, is supplied under a pressure comprised between 5 bar and more, such as 5.5 bars, or 6.0 bars up to 10 bars or 12 bars or 15 bars. Still higher pressure being applicable if needed.

FIG. 12 provides for a further embodiment, wherein the inlet (L, 6) for feeding the slurry to the liquid nozzle is made via the air inlet (I, 9). Said arrangement, being freely applicable to the other embodiments of the present invention.

It is within the understanding of the skilled person that the components of the system do not need to be provided in one single assembly. In a further preferred embodiment (FIG. 13) the in line fluid mixing chamber or static mixing chamber 5 comprising the slurry feed inlet 6, the high pressure air inlet 7 and the dilution inlet 8 may be in a separate device or housing M connected via at least one interconnecting device ICD, such as a tube, hose, or pipe to the atomizing head H, comprising the atomizer nozzle tip 1, a liquid nozzle 2, the converging air header housing 3, with the air transition cone A, surrounding in circular manner the liquid nozzle 2 which is connected to a central lance tube 4. Inlet 9 provides for a supply of gas or a gas mixture such as air, vapour, steam, which allows for the introduction of a large volume of (low pressure) air, gas or steam which is directed as a co-current ring of air, gas or steam around the liquid nozzle 2. The central lance tube 4 being supplied via the interconnecting device ICD with a suitable product to be atomized which is supplied form the device comprising the mixing chamber 5. 9*a* in FIG. 13 provides for an alternative design for the inlet. Device H can be further mounted on a lance to allow particular placement of the atomizer in specific application, either automated or manually e.g. in agricultural applications, spray painting, fire fighting or other applications mentioned hereto before, where a particular positioning of the atomizer is desired or necessary. It will be within the understanding of the skilled person, that device H can be uses either way, in combination with device M or without. With respect to the interconnecting device ICD, the skilled person is well aware of problematic encountered by such means. However, the skilled person knows which material, dimensions, (i.e. diameter and wall thickness) and what kind of connecting means, such as couplings, clamping devices or clip collars, are suitable to reversibly or irreversibly connect the devices H and M with each other.

The atomizer nozzle tip 1 provides for a directed atomized droplet cloud which can have a particular shape and density according to the nozzle tip size, form, geometry and applied air pressure. Said air pressure is comprised between 0.02 bar to 4.0 bars, preferably between 0.04 bar to 3.0 bars, more preferably between 0.1 bar to 2.5 bars, still more preferably between 0.5 bar to 2.0 bars, still preferable between 0.8 and 2.0 bars. The design allows for the use of all kind of apparatus providing for low to high pressure air from standard rotary lobed blowers, or fans, up to compressors. Apparatus providing for low pressure air are preferred as they result in lower capital, operating and maintenance cost.

Further to this, the geometry of the atomized droplet cloud can be changed by mounting a transition plate or element TE at the end of the nozzle tip 1. Such a transition element is shown in FIG. 14. Such transition elements allow to transform the cone shaped atomized fluid into flattened or curtain shaped atomized fluid. Such shaping allows for custom tailored applications, wherein the atomized fluid is rather needed in curtain shape than a cone shape.

Transition elements can be of many different designs. The objective is to achieve a desired, for example, a rectangular conical spray pattern without negatively affecting the droplet size distribution. This can be accomplished by incorporating a slight reduction in the cross-sectional area relative to the nozzle tip. The area reduction is in the range of from about 0% to 25%, preferably from about 0% to 20%, more preferably form about 0% to about 10%, depending on the properties of the gas and/or particulate stream. Transition elements with other geometries may be mounted onto the nozzle tip according particular need and use. Tables 2 provide for different geometries of the transition elements which shall be considered as a non-limiting designs.

TABLE 2a

| Type | 1-28 | 2-28 | 3-28 | 1-40 | 2-40 | 3-40 |
|---|---|---|---|---|---|---|
| Pipe size diameter in mm (inch) | 19.05 (¾) | 19.05 (¾) | 19.05 (¾) | 19.05 (¾) | 19.05 (¾) | 19.05 (¾) |
| Sched. | 28 | 28 | 28 | 40 | 40 | 40 |
| t = plate thickness in mm (inch) | 12.7 (0.5) | 12.7 (0.5) | 12.7 (0.5) | 12.7 (0.5) | 12.7 (0.5) | 12.7 (0.5) |
| L = plate length in mm (inch) | 63.5 (2.5) | 63.5 (2.5) | 63.5 (2.5) | 63.5 (2.5) | 63.5 (2.5) | 63.5 (2.5) |
| W = plate width in mm (inch) | 44.45 (1.75) | 44.45 (1.75) | 44.45 (1.75) | 44.45 (1.75) | 44.45 (1.75) | 44.45 (1.75) |
| α = transition angle in deg. | 28 | 28 | 28 | 40 | 40 | 40 |
| d = transition diameter, round end in mm (inch) | 20.955 (0.825) | 20.955 (0.825) | 20.955 (0.825) | 20.955 (0.825) | 20.955 (0.825) | 20.955 (0.825) |
| l = opening length, rectangular end in mm (inch) | 34.4678 (1.357) | 34.4678 (1.357) | 34.4678 (1.357) | 42.2656 (1.664) | 42.2656 (1.664) | 42.2656 (1.664) |
| w = opening width, rectangular end in mm (inch) | 9.9822 (0.393) | 9.7282 (0.383) | 9.4996 (0.374) | 8.1280 (0.320) | 7.9248 (0.312) | 7.7470 (0.305) |

The half coupling HC, is a 150 lb. half coupling adapted to the pipe size. The half coupling is continuously welded to the transition plate in an air tight manner. Other fixing or mounting means which provide for an air tight connection are known to the skilled person and are thus hereby included. The internal joint centered on the coupling must be smooth to minimize turbulences. The corners of the transition plates are preferably rounded and free of burrs. The dimensional tolerances for the transition outlet (rectangular end) lies within regular tolerances such as ±0.1 mm. It is within the conception of the present invention that the transition element is a versatile element and can be made for different pipe sizes, i.e. different nozzle tip diameters such as ½, ¾, 1, 1¼, 1½ inch, corresponding to diameters of 12.70 mm, 19.05 mm, 25.40 mm, 31.75 mm, or 38.10 mm. It lies within the discretion of the skilled person to choose other diameters which are above or below these values as well, and as a consequence of the selection of different diameter size, the other dimensions of the transition plate need to be adapted accordingly, which lies in the competence of the skilled person.

Figure 15:
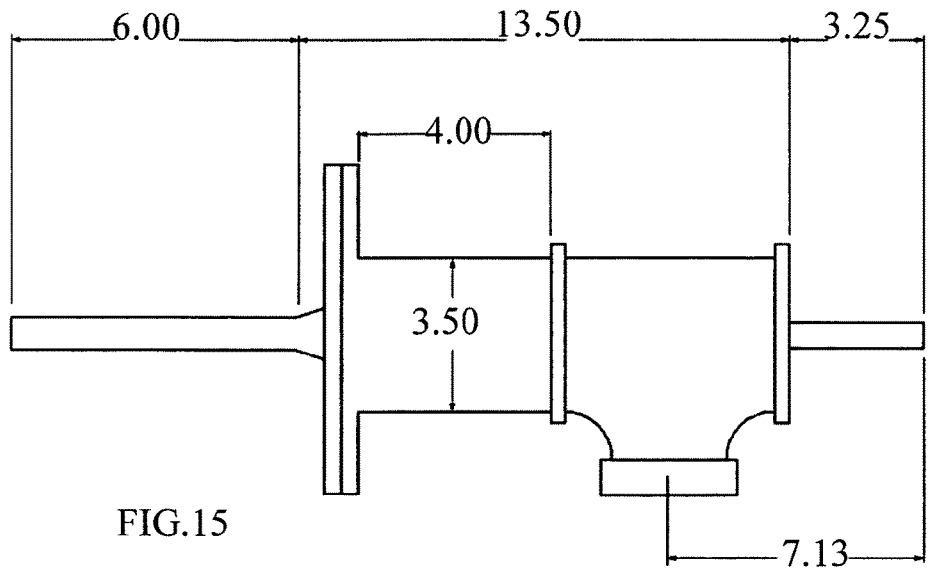
FIG. 15 illustrates a cross sectional view of an alternate configuration of the atomizer of the present invention with dimension indications in inch and a conversion table of inch to mm.

FIG. 15 shows a schematic drawing of an embodiment with indication of suitable dimensions in inches. The dimensions however are not to be considered as binding. Accordingly the dimensions can be up- or down-scaled according to the needs.

Solid matter comprising slurries suitable for being dispersed by the atomizer of the present invention are well known to the skilled person and comprise mineral material such as alkaline earth carbonates, alkaline earth hydroxides, alkaline earth oxides, or fly ash. The alkaline earth carbonates for example comprise natural ground calcium carbonate (GCC) such as marble, chalk or limestone, synthetic calcium carbonate such as precipitated calcium carbonates (PCC) such as aragonitic PCC, vateritic PCC and/or calcitic PCC, especially prismatic, rhombohedral or scalenohedral PCC, or surface modified calcium carbonates and miscellaneous analogue fillers containing calcium carbonates such as dolomite or mixed carbonate based fillers; various matter such as talc or analogues; mica, clay titanium dioxide, bentonite, magnesite, satin white, sepiolite, huntite, diatomite, silicates; and mixtures thereof but is not limited to.

Other solid matter comprising slurries can be chosen according to the desired application of the atomizer, as well as liquids and dispersions and emulsions are suitable to be used with the atomizer of the present invention according to their specific use.

In general the high solid mineral material slurry comprises of at least one mineral material in an aqueous suspension with a solids content from about 30 wt % up to 80 wt %, preferably from about 72 wt % to about 79 wt %, more preferably form about 74 wt % to about 78 wt % based on the total weight of the suspension. High solid content slurries are preferred as they allow for the dispersion of larger amount of solid materials, whereas low solid content slurries 5 wt % to about 30 wt % are not excluded from the use with the atomizer of the present invention.

The aqueous suspension may further comprise at least one dispersing agent in total amounts of from about 0.01 wt % to about 2 wt %, preferably from about 0.04 wt % to about 1.5 wt %, more preferably form about 0.1 wt % to about 1 wt %, still more preferable from about 0.3 w % to about 0.6 wt % based on the dry weight of the mineral material.

Dispersing agents, which may be used are selected from the group comprising homo- or copolymers of polycarboxylic acids such as acrylic or methacrylic acids or maleic acids; and/or their salts, e.g. partially or completely neutralised acid salts with sodium, lithium, potassium, ammonium, calcium, magnesium, strontium, and/or aluminum or mixtures thereof, preferably sodium, calcium and magnesium, or derivatives of such acids such as esters based on, e.g. acrylic acids, methacrylic acid, maleic acid, fumaric acid, itaconic acid, e.g. acryl amide or acrylic esters such as methylmethacrylate or mixtures thereof; alkali polyphosphates; or mixtures thereof.

The weight molecular weight Mw of such products is preferably in the range of from 1000 to 15000 g/mol, more preferably in the range of from 3000 to 7000 g/mol, e.g. 3500 g/mol, most preferably in the range of from 4000 to 6000 g/mol, e.g. 5500 g/mol.

The mineral material particles of the aqueous slurry have an equivalent spherical diameter of <2 μm, preferably <1 μm, still preferably <0.5 μm. The equivalent spherical diameter is therefore ranges from about 0.1 μm to about 1.9 μm. Preferably from about 0.4 μm to about 0.9 μm.

The Brookfield viscosity of the mineral matter slurry measured at 23° C. after 1 minute of stirring by the use of a RVT model Brookfield™ viscosimeter at room temperature and a rotation speed of 100 rpm with the appropriate spindle is from 50 to 1000 mPa·s, preferably 100 to 750 mPa·s, more preferably from 150 to 600 mPa·s, most preferably from 200 to 460 mPa·s, e.g. 300 mPa·s.

Such mineral matter slurries are known to the skilled person and are readily commercially available, such as Hydrocarb 90®, Hydrocarb 60®, Hydrocarb HG®, supplied by OMYA, or other mineral matter slurries or dispersions commercially available. Within the context of the present invention liquid mineral matter shall address any sort of solid mineral matter as made down into a solvent.

Other material which are practical to be in a dispersed form and provide for increased reactivity or improved processing can be disbursed into droplets by the atomizer of the present invention as well. The skilled person will readily recognize that not only dispersions or slurries are suitable products to be atomized by the present invention, but also simple solutions or liquids, i.e. one phase mixtures of liquids and therein dissolved substances, such as fertilizer, herbicides, fungicides, or fire extinguishing means can be atomized by the present invention.

Table 3 show the influence on the droplet sized depending on the nozzle type, the flow rate of sprayed test fluid through the liquid nozzle 2, and the air flow rate within the air pressure header 4.

TABLE 3

| Test Conditions | | | | | | | | |
|---|---|---|---|---|---|---|---|---|
| TC | Liquid Type | Flow Rate (l/min) | Nozzle Type | Air Flow Rate ($m^3$/min) | $D_v0.1$ | D32 (microns) | $D_v0.5$ | $D_v0.99$ |
| 1 | A | 0.57 | ¼M-8 | 0-Open Air | 74.23 | 120.40 | 151.00 | 445.04 |
| 2 | A | 0.57 | ¼M-8 | 1.4 | 8.66 | 15.58 | 23.57 | 65.68 |
| 3 | A | 0.57 | ¼M-8 | 1.6 | 7.92 | 13.88 | 20.25 | 52.69 |
| 4 | A | 0.38 | ¼M-8 | 1.6 | 6.86 | 12.35 | 18.49 | 51.28 |
| 5 | A | 0.19 | ¼M-8 | 1.6 | 5.54 | 10.03 | 14.96 | 42.15 |
| 6 | A | 0.57 | ¼M-8 | 0.8 | 15.52 | 28.28 | 45.44 | 133.74 |
| 7 | A | 0.72 | ¼M-4 | 1.6 | 6.84 | 11.76 | 16.80 | 41.99 |
| 8 | A | 0.72 | ¼M-8 | 1.6 | 9.40 | 16.95 | 25.8 | 72.17 |
| 9 | A | 0.72 | ¼M-8 | 1.6-Open Air | 21.39 | 38.02 | 58.38 | 160.53 |
| 10 | A | 0.72 | ¼M-8 | 1.4-Reduced Nipple | 9.19 | 19.78 | 42.21 | 212.29 |
| 11 | A | 0.57 | ¼M-8 | 2.8 | 5.92 | 9.46 | 14.80 | 48.76 |
| 12 | A | 0.57 | ¼M-8 | 5.2 | 5.14 | 8.08 | 11.01 | 24.25 |
| 13 | A | 1.89 | SpiralJet 7 | 5.2 | 5.75 | 10.61 | 16.13 | 47.47 |
| 14 | A | 2.65 | SpiralJet 7 | 5.2 | 5.95 | 11.55 | 18.66 | 62.81 |
| 15 | A | 0.57 | Flomax X015 | 0.4 | 8.42 | 14.40 | 20.37 | 49.98 |
| 16 | A | 0.38 | Flomax X015 | 0.4 | 6.01 | 10.42 | 15.00 | 38.52 |

Testing was performed using the following nozzles:

hydraulic nozzles ¼M-8, and ¼M-4;

SpiralJet nozzles were used for high liquid flow rate conditions.

Flomax X015

The material used for spray testing was Hydrocarb 60®, high solid calcium carbonate slurry diluted to 28 wt % solids in water without surfactant (Liquid Type A).

The Flomax X015 nozzle proved to be more efficient than other commercially available nozzle configurations done with the atomizing device of the present invention. Smaller drop sizes are reached at lower air flow rate, as can be seen in test condition (TC) 16.

Further to this, the importance of the nozzle tip becomes evident as can be seen in TC 9, where the slurry is sprayed without a nozzle tip but with a surrounding air flow at a rate of 1.6 $m^3$/min. Drop sized is reduce compared to TC 1 where no air flow was used. TC 1 shows the spray effect from the nozzle's own performance. TC 10 shows that when no converging transition cone is present, "reduced nipple" stands for an abrupt transition form the housing to the nozzle tip, drop size increases again due to inconsistent air stream, promoting collision of the droplets and thus leading to larger droplet size.

Drop size measurements were taken with a Malvern 2600 particle analyzer. The Malvern analyzer is a laser diffraction instrument that measures drop size based on the energy of the diffracted light caused by drops passing through the analyzer's sampling area.

The scattered light intensity is measured using a series of semicircular photo diodes housed in the receiver unit. The Rosin-Rammler distribution function is used to convert the light intensity distribution into a drop size distribution function. Testing was performed using a 300 mm receiver lens. This lens configuration allows a measurement range of 1.2 and 564 μm, for the Malvern 2600 instrument. All testing was done at a spray distance of 610 mm.

A Spraying Systems Co.® AutoJet® 2250 Modular Spray System was used to control the liquid pressure and flow rate. The AutoJet® Modular Spray System is a self-contained, modular spraying system that enhances the performance of spray nozzles. Consisting of two basic components, an electrical control panel and a pneumatic control panel, the modular system provides the power of a fully integrated system.

In a preferred embodiment the atomization inside the nozzle is assisted with dry compressed air. The atomization air was at room temperature (20° C.) for all tests. Moreover, it was steady and consistent throughout testing. The compressed air flow rates were measured with a calibrated thermal mass meter manufactured by Endress-Hauser. This meter measures the air/nitrogen temperature and pressure at the measurement location to directly determine the mass flow rate. The high-accuracy (±1%) measurement range of this meter was from 0.0003 $m^3$/min to about 12.0 $m^3$/min (which is equal to 0.3 l/min to about 12'000 l/min).

The $D_{V0.5}$, $D_{32}$, $D_{V0.1}$ and $D_{V0.9}$ diameters were used to evaluate the drop size. The drop size terminology is as follows:

$D_{V0.5}$: Volume Median Diameter (also known as VMD or MVD). A means of expressing drop size in terms of the volume of liquid sprayed. The VMD is a value where 50% of the total volume (or mass) of liquid sprayed is made up of drops with diameters larger than the median value and 50% smaller than the median value. This diameter is used to compare the change in drop size on average between test conditions.

$D_{32}$: Sauter Mean Diameter (also known as SMD) is a means of expressing the fineness of a spray in terms of the surface area produced by the spray. The Sauter Mean Diameter is the diameter of a drop having the same volume to surface area ratio as the total volume of all the drops to the total surface area of all the drops.

$D_{V0.1}$: is a value where 10% of the total volume (or mass) of liquid sprayed is made up of drops with diameters smaller or equal to this value.

$D_{V0.99}$: is a value where 99% of the total volume (or mass) of liquid sprayed is made up of drops with diameters smaller or equal to this value. This value can also be used as $D_{MAX}$.

Figure 16:
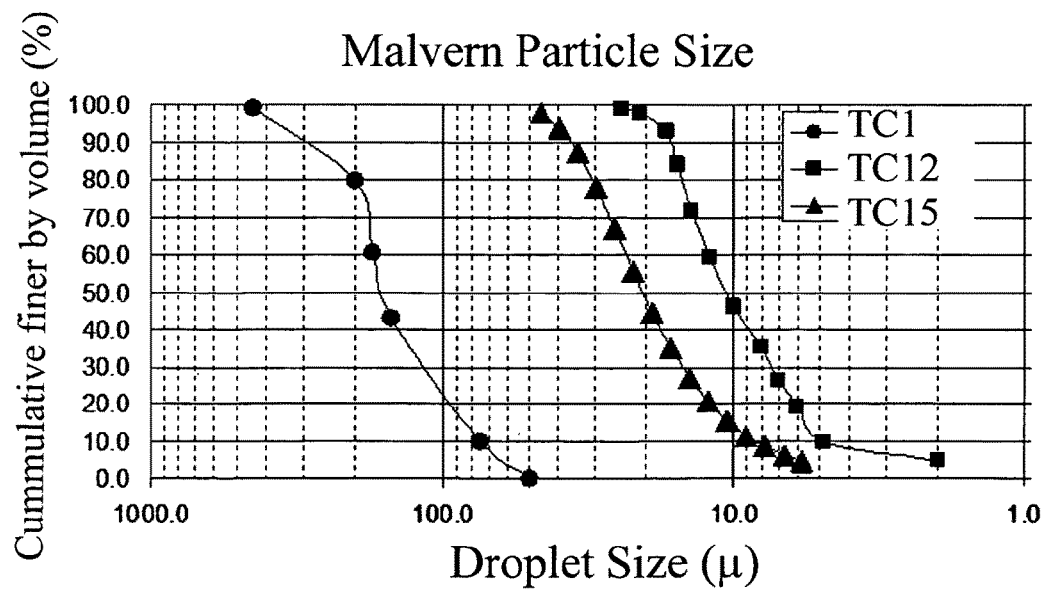
FIG. 16 compares the performance of prior art spraying systems with the spraying system of the present invention.

FIG. 16 shows the comparison of the performance of a standard spraying system ¼M-8 nozzle spraying in open air (TC 1) to that of the same nozzle installed in the atomizing device using the same slurry feed (TC 12). An important size reduction of the droplets is observed.

TC 15 shows the performance of Spraying Systems best available technology for producing fine droplets with the Flomax X015 fogging nozzle under same feed conditions as TC 1. TC 12 clearly shows that the atomizing device of the present invention provides for smaller droplet size distribution compared to the best available of the prior art.

The atomizer of the present invention provides for micronized droplets with a diameter in the range of about 2 μm to about 12 μm.

It is at the discretion of the user which commercially available liquid nozzles are used in the atomizing device, since the liquid nozzle 2 is exchangeable for any suitable liquid nozzle, and its use in the atomizing device of the present invention will noteworthy improve its performance. In general the performance of any nozzle can be improved when said nozzle is installed in an atomizing device of the present invention. Irrespective of the size of the nozzle, because the converging air header cone A, the housing, the nozzle tip or the converging air header cone A carrying nozzle tip 1, which is a particular embodiment, can be custom build to fit the selected nozzle.

One potential use can be for example in sorbent injection technology, wherein a proprietary material is disbursed into small droplets by the atomizer of the present invention in an industrial power and heating boiler, in order to remove acid or toxic gas and heavy metals from the flue gas, generated during combustion. Such acid or toxic gas comprises, HCl, $SO_2$, CO, NOx. Example for a heavy metal accumulated in such combustion processes is Mercury (Hg).

The present invention also concerns a process for micronizing a fluid comprising the steps of providing and atomizer device of the present invention, providing a fluid for micronization wherein the fluid is provided via the central lance tube (4) to the liquid nozzle (2), and wherein a gas is provided via the air inlet (9), said gas being accelerated via the converging air transition cone (A) in a co-current ring of gas, and being contacted with the sprayed fluid escaping from the nozzle thereby forming droplets which are conveyed through the atomizer nozzle tip (1).

The said fluid comprising a liquid or liquid mixture, a suspension, dispersion or an emulsion, and wherein said liquid or liquid mixture, suspension dispersion or emulsion is a crop- or plant protectant or fertilizer.

The present invention further concerns a process for micronizing a fluid, wherein the fluid is a fire extinguishing agent.

Still further the present invention concerns a process, wherein the suspension is a mineral matter suspension, or wherein the dispersion is a mineral matter dispersion.

The present invention also concerns the use of the micronized droplets, wherein such droplets are used in crop- of plant protection, fertilisation.

A further use of the micronized droplets according to the present invention is the use in fire fighting.

A further use of such micronized droplets is in a furnace sorbent injection method, in spray drying or fire fighting, wherein the fluid is a dispersion or a suspension of mineral matter.

The invention claimed is:

1. An atomizing device comprising (a) an atomizer nozzle tip configured to spray atomized liquid, wherein the atomizer nozzle tip has an entrance, (b) a liquid nozzle configured to create a full or a hollow cone spray, (c) a central lance tube connected to the liquid nozzle, (d) a liquid inlet configured to feed liquid to the central lance tube, (e) an air transition cone disposed at the entrance of the atomizer nozzle tip and integral with the atomizer nozzle tip, wherein the air transition cone surrounds in a circular manner the liquid nozzle and defines a co-current ring between the air transition cone and the liquid nozzle for receiving gas, (f) a housing having (i) a converging air header, and (ii) at least one air inlet for supplying gas as a co-current ring around the liquid nozzle between the liquid nozzle and the air transition cone, and (g) a high shear zone disposed at the entrance of the atomizer nozzle tip, wherein droplets from the liquid nozzle converge with gas from the converging air header at a volume ratio of gas to liquid sprayed from the liquid nozzle of 100:1 to 8000:1, and wherein the position of the liquid nozzle is configured to be adjustable from within to out of the air transition cone in a direction toward the atomizer nozzle tip.

2. The atomizing device according to claim 1, wherein the atomizer nozzle tip and the air transition cone are connected with each other.

3. The atomizing device according to claim 2, wherein the atomizer nozzle tip connected with the air transition cone are reversibly connected to the housing.

4. The atomizing device according to claim 1, further comprising a transition element at the end of the atomizer nozzle tip.

5. The atomizing device according to claim 1, wherein the liquid nozzle and the central lance tube are movable forward and backward inside the air transition cone.

6. The atomizing device according to claim 1, wherein the housing comprises two movable overlapping parts that slide relative to each other, where one housing part comprises the atomizer nozzle tip connected to the air transition cone, and the other housing part is connected to the central lance tube and the air inlet, such that the liquid nozzle and the central lance tube are movable forward and backward inside the air transition cone.

7. The atomizing device according to claim 1, wherein the atomizer nozzle tip is connected to the air transition cone on a mounting device.

8. The atomizing device according to claim 7, wherein the mounting device is a nozzle tip mounting flange.

9. The atomizing device according to claim 1, further comprising one or more spacing plates disposed between the atomizer nozzle tip and the central lance tube.

10. The atomizing device according to claim 1, further comprising a diffuser plate disposed between the air transition cone and the at least one air inlet.

11. The atomizing device according to claim 1, wherein the air transition cone has an opening angle from 0° to 180°.

12. The atomizing device according to claim 1, wherein atomizer tip has a diameter and the housing has a diameter, and the ratio of the diameters of the atomizer nozzle tip and the housing are from 1:1 to 1:10.

13. The atomizing device according to claim 1, wherein the atomizer tip has a diameter and the housing has a diameter, and ratio of the diameters of the atomizer nozzle tip and the housing are from 1:1 to 1:7.

14. The atomizing device according to claim 1, wherein the atomizer tip has a diameter and the housing has a diameter, and ratio of the diameters of the atomizer nozzle tip and the housing are from 1:1 to 1:4.

15. The atomizing device according to claim 1, wherein the atomizer nozzle tip has a length to diameter ratio of from about 50:1 to about 0.5:1.

16. The atomizing device according to claim 1, wherein the atomizer nozzle tip has a length to diameter ratio of from about 20:1 to about 1:1.

17. The atomizing device according to claim 1, wherein the atomizer nozzle tip has a length to diameter ratio of from about 15:1 to about 5:1.

18. The atomizing device according to claim 1, wherein the atomizer nozzle tip has an angular offset of 180° to 90°.

19. The atomizing device according to claim 1, further comprising a mixing chamber that is disposed between the central lance tube and the liquid inlet.

20. The atomizing device according to claim 18, wherein the mixing chamber is a static mixing device or a high shear mixing device.

* * * * *